United States Patent [19]

Nier

[11] 3,720,999

[45] March 20, 1973

[54] METHOD OF ASSEMBLING TRANSISTORS

[75] Inventor: Johannes Nier, Stuttgart, Germany

[73] Assignee: Robert Bosch GmbH, Stuttgart, Germany

[22] Filed: April 29, 1971

[21] Appl. No.: 138,666

Related U.S. Application Data

[60] Continuation-in-part of Ser. No. 869,583, Oct. 27, 1969, abandoned, which is a division of Ser. No. 757,407, Sept. 4, 1968, Pat. No. 3,584,265.

[30] Foreign Application Priority Data

May 9, 1970 Germany....................P 20 22 717.2

[52] U.S. Cl. .....................29/587, 29/471.1, 29/493, 29/589, 29/591, 29/626, 39/628

[51] Int. Cl. .........B01j 17/00, H011 5/04, H011 7/60, H011 9/08, H011 11/02, H011 11/04, H011 15/08

[58] Field of Search..........29/471.1, 471.3, 589, 591, 29/493, 587, 626, 628

[56] References Cited

UNITED STATES PATENTS

| | | | |
|---|---|---|---|
| 2,371,754 | 3/1945 | Gillum et al. | 29/471.3 X |
| 2,666,874 | 1/1954 | Borton | 29/587 X |
| 2,999,194 | 9/1961 | Boswell et al. | 29/589 UX |
| 3,005,257 | 10/1961 | Fox | 29/493 X |
| 3,161,811 | 12/1964 | Brown | 174/52.S |
| 3,209,450 | 10/1965 | Klein et al | 29/589X |
| 3,267,409 | 8/1966 | Horwitz | 29/591 X |
| 3,390,450 | 7/1968 | Checki, Jr. et al. | |

FOREIGN PATENTS OR APPLICATIONS

| | | | |
|---|---|---|---|
| 842,957 | 8/1960 | Great Britain | 317/235 |

*Primary Examiner*—J. Spencer Overholser
*Assistant Examiner*—Ronald J. Shore
*Attorney*—Michael S. Striker

[57] ABSTRACT

A transistor, wherein a semiconductor wafer is soldered to a metallic base and has one or two exposed contacts which are connected to pin-shaped terminals of the base by U-shaped elastic leads having coiled first end portions, straight intermediate portions and straight second end portions, is assembled by deforming the leads to tilt the coiled end portions with reference to the terminals and to thereby clamp such coiled end portions to the terminals in positions in which the end faces of the second end portions are in full surface-to-surface abutment with layers of solder which coat the contacts on the wafer, or by causing the second end portions to bear against the respective contacts merely by the action of gravity. The thus assembled working parts of the transistor are thereupon heated in a soldering furnace to bond the wafer to the base and to simultaneously solder the second end portions of the leads to the respective contacts. The coiled end portions are bonded to the respective terminals in response to melting of rings of soft solder which are slipped onto the terminals prior to heating so as to rest on the respective coiled end portions.

9 Claims, 17 Drawing Figures

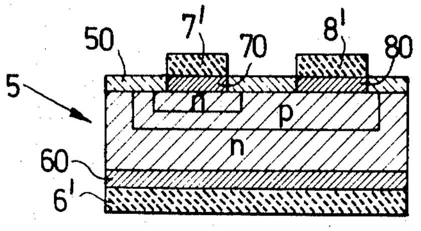
Fig. I
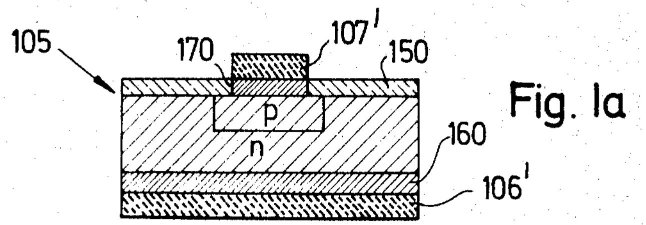
Fig. Ia
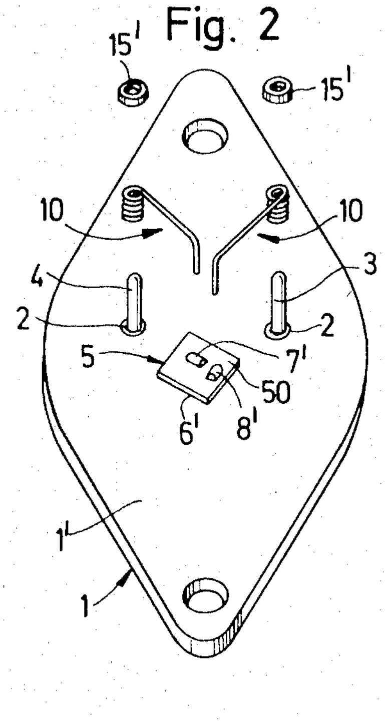
Fig. 2
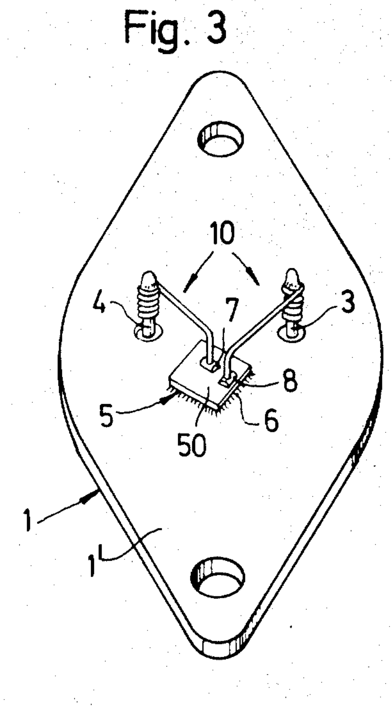
Fig. 3
INVENTOR.
JOHANNES NIER
BY
[signature]
Attorney INVENTOR.
BY JOHANNES NIER
[signature]
Attorney INVENTOR.
JOHANNES NIER
BY
[signature]
Attorney INVENTOR
JOHANNES NIER
BY
Attorney

METHOD OF ASSEMBLING TRANSISTORS

CROSS-REFERENCE TO RELATED APPLICATION

This application is a continuation-in-part of my copending application Ser. No. 869,583 filed Oct. 27, 1969, and now abandoned which is a division of my application Ser. No. 757,407 filed Sept. 4, 1968, now U.S. Pat. No. 3,584,265 granted June 8, 1971.

BACKGROUND OF THE INVENTION

The present invention relates to improvements in methods of assembling the components or working parts of transistors. More particularly, the invention relates to improvements in methods of assembling transistors of the type wherein a semiconductor die or wafer (also called chip) containing a transistor system or an integrated circuit has one of its sides soldered to a metallic base and wherein the other side of the wafer is provided with one or more contacts which are insulated from each other and are connected with terminals or electrodes which are supported by and insulated from the base.

In presently known power amplifier transistors, the collector contact is secured to the metallic base by means of soft solder on the lead basis (i.e., a solder containing a relatively high percentage of lead). The base and the emitter contacts of the wafer are connected with wire-like leads which exhibit some elasticity and normally consist of bronze or a similar alloy. The leads are clamped by mechanical means to the respective terminals on the base and are mounted in prestressed condition so that the innate resiliency of the leads urges their free ends against the respective contacts. A drawback of such transistors is that the bias of each lead upon the semiconductor wafer is not the same so that the wafer is likely to tilt during soldering. Such tilting of the wafer with reference to the metallic base results in the formation of a wedge-like fillet between the base and the collector contact. This is due to the fact that the leads are clamped to the respective terminals by mechanical means and that the initial stressing of the thus clamped leads and their bias upon the wafer cannot be selected with a satisfactory degree of accuracy. Unequal stressing of the wafer causes the latter to tilt during soldering when the layer of solder between the wafer and the base melts. Adjustment of leads which are clamped to the terminals on the base prior to soldering of such leads to the corresponding contacts of the wafer necessitates the use of magnifying glasses and/or microscopes and normally entails permanent deformation of leads and/or terminals. The problem of adjusting the leads is further aggravated if the contacts on the wafer are very small so that the leads must be clamped to their terminals with utmost precision in order to insure that the free ends of the thus clamped leads will properly engage with and will be soldered to the corresponding contacts of the wafer.

SUMMARY OF THE INVENTION

An object of the invention is to provide a novel and improved method of assembling the working parts of transistors, particularly of connecting the leads to terminals on a metallic base and to contacts on a semiconductor wafer which is to be bonded to the base.

Another object of the invention is to provide a method according to which the leads need not be clamped to the respective terminals by discrete mechanical parts prior to bonding of their ends to the respective contacts of the wafer or wafers.

A further object of the invention is to provide a method of assembling the working parts of transistors which can be carried out by resorting to automatic machinery or to semiskilled or unskilled labor.

An additional object of the invention is to provide a method of assembling the working parts of transistors which can be resorted to in mass-production of transistors exhibiting identical characteristics and with fewer rejects than in accordance with the presently known methods.

Still another object of the invention is to provide a novel and improved method of assembling the working parts of transistors prior to bonding of such parts to each other.

The method of the present invention can be employed for assembling the working parts of a transistor wherein a semiconductor wafer is provided with at least two contacts and is to be bonded to a metallic base as well as to one end portion of an elastic lead the other end portion of which is to be bonded to a terminal or electrode mounted in and insulated from the base. The bonding agent is preferably a soft solder. The method comprises the steps of applying a preferably ring-shaped body of soft solder over a coiled end portion which forms part of an elastic lead and surrounds the terminal so that the ring overlies the coiled end portion while a second end portion of the lead bears against a layer of solder on a contact on the semiconductor wafer (which is placed into abutment with the base), either under the weight of the lead and/or solder ring or in response to the application of an external deforming force which causes the second end portion to bear against the layer of solder on the corresponding contact with a force greatly exceeding the force due to the combined weight of the lead and the solder ring, and thereupon heating the ring to melting temperature so that the material of the ring melts and forms a fillet which bonds the coiled end portion of the lead to the terminal. The melting step can be carried out in vacuo or in a protective atmosphere of inert gas while the working parts of the transistor are transported through a suitable soldering furnace. The internal diameter of the solder ring preferably exceeds the diameter of the terminal so that the ring is free to rest on the coiled end portion of the lead by gravity.

The aforementioned external deforming force is preferably applied to the coiled end portion of the lead to move the coiled end portion toward the base while the second end portion of the lead bears against the layer of solder on the corresponding contact of the wafer. The inclination of the second end portion with reference to the wafer prior to axial shifting of the coiled end portion is preferably selected in such a way that the end face of the second end portion moves into full surface-to-surface abutment with the solder layer on the corresponding contact when the axial shifting of the coiled end portion along the terminal is completed. This causes the coiled end portion to become wedged to the terminal and remains in the selected axial position during transport through the furnace and during hardening of the filler which is obtained in response to melting of the solder ring.

The novel features which are considered as characteristic of the invention are set forth in particular in the appended claims. The improved transistor itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an enlarged sectional view of a semiconductor wafer which can be used as a working part of a transistor which is to be assembled in accordance with the method of the present invention;

FIG. 1*a* is a similar sectional view of a modified semiconductor wafer;

FIG. 2 is an exploded perspective view of working parts in a transistor which includes the wafer of FIG. 1 and is about to be assembled in accordance with a first embodiment of my method;

FIG. 3 is a perspective view of the finished transistor;

DESCRIPTION OF THE PREFERRED EMBODIMENTS

Figure 4:
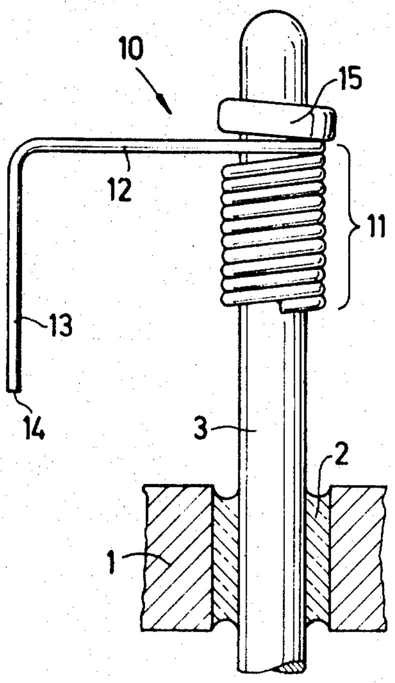
FIG. 4 is an enlarged elevational view of a lead in the transistor of FIG. 3 prior to bonding of the lead to the respective terminal and to the respective contact.

FIG. 1 illustrates a semiconductor die or wafer 5 which is of the n-p-n type. It consists of silicon and includes an emitter zone, a base zone and a collector zone. The underside of the wafer 5 is provided with a metallic conductor 60 in the form of a film or layer which completely covers the underside of the wafer and constitutes the collector contact. The upper side of the wafer 5 is provided with a substantially centrally located second metallic contact 70 and with a third metallic contact 80 which is adjacent to one edge of the wafer. The contact 70 is the emitter contact and the contact 80 is the base contact of the semiconductor wafer. The contacts 60, 70, 80 consists of nickel. Those portions of the upper side of the wafer 5 which are not concealed by the contacts 70, 80 are coated with an oxide layer 50. The exposed surfaces of the contacts 60, 70, 80 are respectively coated with relatively thick layers 6', 7', 8' of lead-tin solder. The solder of the layers 6', 7', 8' is a soft solder, i.e., it contains a relatively high percentage of lead.

FIG. 1*a* illustrates a different semiconductor die or wafer 105 which is of the p-n type. This wafer constitutes a diode and its underside is completely covered with a first metallic conductor 160 which constitutes the cathode contact of the diode. The upper side of the wafer 105 is provided with a second metallic conductor 170 which constitutes the anode contact of the diode. The contacts 160 and 170 consist of nickel. That portion of the upper side of the wafer 105 which is not covered with the material of the anode contact 170 is coated with an oxide layer 150. The contacts 160 and 170 are respectively coated with layers 106' and 107' of lead-tin solder.

FIG. 2 illustrates the working elements or components of a semiconductor device or transistor which is to be assembled in accordance with one embodiment of my method and employs the wafer 5 of FIG. 1. These working parts include the wafer 5 and a base plate 1 which provides a heat sink for dissipating the heat which results from the operation of the transistor and has two outwardly extending flanges provided with mounting holes for securing the transistor on a chassis or the like. The base plate 1 supports two pin-shaped terminals or electrodes 3, 4 which are sealed therein by insulators 2 consisting of glass or other insulating sealing material. The terminals 3, 4 project beyond the upper surface 1' of the base plate 1. The wafer 5 is placed onto the central portion of the upper surface 1' of the base plate 1 in such a way that the layer 6' of solder abuts against the surface 1'. The layers 7' and 8' are readily accessible.

The conductors which respectively connect the layers 7', 8' with the terminals 3, 4 comprise two wire-like U-shaped leads 10 which preferably consist of or contain a relatively high percentage of silver. The diameters of the leads 10 depend on the anticipated current strength and are normally in the range of one or more tenths of a millimeter. These leads can also be made of other metallic material which is a good conductor of electric current and can be readily deformed as well as bonded to the terminals 3, 4 and layers 7', 8'. Also, the characteristics of the metals or alloys of which the leads 10 consist should be such that they do not adversely affect the electrical properties of the wafer 5, either during soldering or when the transistor is in use, for example, due to evaporation or diffusion of atoms.

The base plate 1 constitutes the bottom wall of an enclosure or housing (not shown) of the assembled transistor.

As shown in FIG. 4, each lead 10 comprises a helically convoluted or coiled end portion 11 whose internal diameter slightly exceeds the diameter of the corresponding terminal 3 or 4, a straight intermediate portion 12 which extends substantially tangentially of and away from the coiled end portion 11, and a straight second end portion 13 which is parallel to the axis of the coiled end portion 11 and has a free end or tip 14. The coiled end portion 11 can be readily formed in a conventional spring winding or coiling machine. The tip 14 is to be soldered to the contact 70 or 80 and the portions 12, 13 preferably make an angle which approximates or equals 90°.

The solder which is needed to bond the coiled end portions 11 of the leads 10 to the terminals 3 and 4 forms rings 15' which are placed on top of the respective coiled end portions 11 when the latter are slipped onto the terminals 3 and 4. The material of the rings 15' is preferably a soft solder with a melting point which is lower than the melting point of solder of the layers 7', 8' as well as that of the layer 6' at the underside of the wafer 5. This is desirable because, when the working elements of the transistor are transported through a soldering furnace, the temperature of the parts 3, 4, 10 and 15' is slightly less (by a few percent) than the temperature of the base plate 1 and wafer 5. This is due to various thermodynamic factors. If the layers 6', 7', 8' consist of lead-tin solder with a high percentage of lead, the rings 15' preferably consist of Sn 96 Ag alloy (with additives in the range of a fraction of 1 percent by weight, such as 0.5 percent by weight of Bi or Sb to avoid tin plague) or of Pb 92.5 Sn 5 alloy.

The internal diameter of each ring 15' slightly exceeds the diameter of the respective terminal 3 or 4 so that such rings can be readily slipped onto the terminals 3, 4 on top of the respective coiled end portions 11. The weight of each ring 15' exerts a relatively small but desirable pressure upon the corresponding lead 10 to urge the tips 14 against the layers 7', 8'.

Experiments have shown that the working parts of the improved transistor can be properly soldered to each other in spite of unavoidable vibrations which take place when the working parts are transported through a soldering furnace, and that such proper soldering can be achieved without resorting to patterns or the like. This is due (to a certain extent) to the fact that, since the material of the leads 10 is preferably severed from a greater length of metallic wire, the sharp edges of the tips 14 automatically penetrate into the exposed surfaces of layers 7', 8' in response to a very small axial pressure upon the end portions 13. Such stabilizing action is further assisted by the relatively high coefficient of friction between the layer 6' and the upper surface 1' of the metallic base plate 1. Thus, even if the soldering operation is carried out without resorting to patterns, the wafer 5 is held in a requisite position with reference to the base plate 1 not only due to friction between the base plate 1 and the layer 6' but also because such friction is enhanced by the pressure which is transmitted to the layers 7', 8' by the tips 14 of the corresponding leads 10. Such friction suffices to prevent shifting of the wafer 5 in response to vibrations during transport of the transistor through the soldering furnace. The soldering operation is preferably carried out in vacuo or in a protective atmosphere of inert gas. When the working parts travel through the furnace and the material of the layers 6', 7', 8' begins to melt, the wafer 5 descends slightly toward the upper surface 1' of the base plate 1 and the coiled end portions 11 slide downwardly along the corresponding terminals 3, 4 to insure the formation of highly satisfactory electrical connections between the end portions 13 and the respective contacts 70, 80. The tips 14 penetrate into the layers 7', 8' during travel through the furnace. Each lead 10 can descend by its own weight and also due to the weight of the corresponding ring 15' but independently of the other lead. Prior to melting of the layers 7' and 8', the tip 14 of each lead 10 abuts against the top surface of the corresponding layer 7', 8' and thereby maintains the coiled end portion 11 at a predetermined level above the base plate 1. The rings 15' melt during travel through the soldering furnace and their material fills the gaps between the terminals 3, 4 and the convolutions of the corresponding coiled portions 11 to form a pair of solder fillets 15 which constitute reliable connections between the leads and the respective terminals. The fully assembled transistor is shown in FIG. 3. The fillets which are formed by the layers 6', 7', 8' are respectively denoted by reference characters 6, 7 and 8.

The material of the rings 15' is preferably an at least substantially eutectic alloy which may consist of 96 percent by weight of Sn and 4 percent by weight of Ag; 96 percent Sn, 4 percent Ag and at least one-tenth of one percent of Bi or Sb; or 92.5 percent Pb, 5 percent Sb and 2.5 percent Ag.

Figure 5:
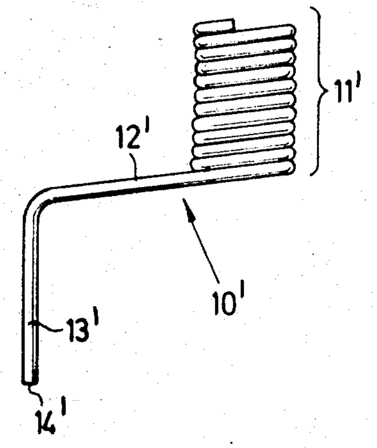
FIG. 5 is a side elevational view of a modified lead.

FIG. 5 illustrates a modified lead 10' having a coiled end portion 11', a straight intermediate portion 12' and a straight second end portion 13' provided with a tip 14'. In this lead, the end portion 13' is parallel to the common axis of the helices which form the coiled end portion 11' but the end portions 11', 13' extend in opposite directions. This brings about savings in material because the end portion 13' can be made shorter than the end portion 13 of the lead 10 shown in FIG. 4, i.e., the electrical resistance of the lead 10' is less than that of the lead 10 and the tendency of the lead 10' to vibrate is also less pronounced than that of the lead 10.

If necessary, the free end of the straight end portion 13 or 13' of each lead 10 or 10' can be coated with a layer of soft solder prior to slipping the coiled end portion 11 or 11' onto the terminal 3 or 4.

The leads 10 and 10' share the common feature of having coiled end portions 11, 11' which can be readily slipped onto pin-shaped terminals or posts, either by resorting to automatic machinery or by resorting to semiskilled or unskilled labor. Such assembling operation can be affected with or without patterns.

Another important feature of the leads 10 or 10' is that they need not be clamped to the terminals 3, 4 prior to soldering. Thus, and since the coiled end portions 11 or 11' surround the terminals 3, 4 with some clearance, each intermediate portion 12 or 12' can be readily moved to an optimum angular position in which the tip 14 or 14' of the associated end portion 13 or 13' bears against a selected zone of the layer 7' or 8'. If desired, one can employ simple patterns to select in advance the position of the wafer 5 with reference to the base plate 1 prior to soldering and to select the angular position of intermediate portions 12 or 12′ before the working parts of the transistor are caused to move through the soldering furnace. The leads 10 or 10′ can be fed to the assembling station by way of chutes or by other suitable guide means so that each coiled end portion 11 or 11′ automatically descends onto the corresponding terminal 3 or 4 and that each tip 14 or 14′ automatically engages the corresponding layer 7′ or 8′. If the assembling operation is carried out by hand, a few simple manipulations suffice to properly mount each lead 10 or 10′ in a requisite position for soldering to the wafer 5 and to the terminal 3 or 4 .

The assembly of a transistor which utilizes the wafer 105 of FIG. 1*a* is simpler than the assembly of the transistor shown in FIG. 3 because the transistor embodying the wafer 105 has a single lead 10 or 10′.

Figure 6:
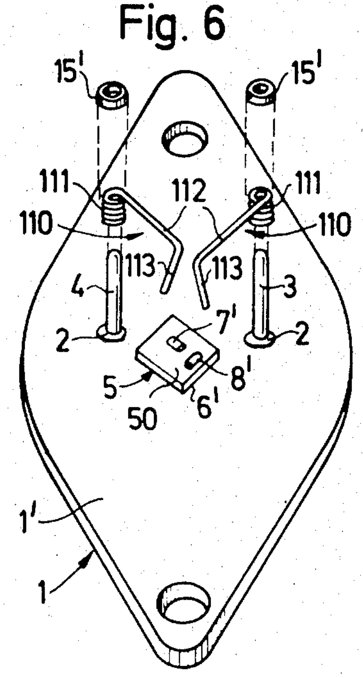
FIG. 6 is an exploded perspective view of working parts in a second transistor which includes the wafer of FIG. 1 but utilizes leads which differ from the leads shown in FIGS. 4 and 5.

FIG. 6 illustrates the working parts of a modified transistor. These working parts are identical with the parts shown in FIG. 3 with the single exception of two modified U-shaped wire-like leads 110.

Each lead 110 comprises a coiled end portion 111, a straight intermediate portion 112, and a straight second end portion 113. In unstressed condition of the lead 110, the intermediate portion 112 makes with the end portion 113 an acute angle beta of slightly less than 90° (see FIG. 8*a*). When the transistor is fully assembled (see FIG. 7), the configuration of the leads 110 resembles the configuration of the leads 10 shown in FIG. 3.

The special configuration of the leads 110 (in undeformed condition) renders it possible to cause the tips 114 of the end portions 113 to bear against the layers 7′ and 8′ of the wafer 5 with a force which exceeds the weight $K_E$ of the leads 110. The presence of greater force is due to the fact that, in accordance with a feature of the improved method, the coiled end portions 111 of the leads 110 are moved axially along the respective terminals 3, 4 in a direction toward the surface 1′ of the base plate 1 with a force K which substantially exceeds the weight $K_E$ of a lead 110. This causes the tips 114 to bear against the layers 7′ and 8′ with a force $K >> K_E$. The oppositely directed reaction force $-K$ which is furnished by the base plate 1 generates a moment of rotation which is transmitted by the portions 113, 112 and tends to tilt the coiled end portion 111 with reference to the axis of the respective terminal 3 or 4. Such moment of rotation causes the end portion 111 to tilt or cant to the extent which is determined by the difference between the outer diameter of the terminal 3 or 4 and the internal diameter of the respective end portion 111. The tilted end portion 111 bears against the peripheral surface of the terminal 3 or 4 at the points 16 and 17 shown in FIG. 8. The convolutions $W_i$ and $W_N$ which bear against the peripheral surface of the terminal 3 shown in FIG. 11 at the points 16 and 17 exert against the terminal a pressure which causes the end portion 111 to jam or "stick" to the terminal.

The forces K cause the end portions 113 of the leads 110 to bias the wafer 5 against the surface 1′ of the base plate 1 through the intermediary of the layers 6′, 7′, 8′ to thus insure that the wafer remains in the selected position and that the tips 114 of the end portions 113 remain in engagement with preselected zones of the layers 7′ and 8′ during assembly of the transistor as well as during transport through the soldering furnace (not shown). This is particularly important when the contacts 70, 80 of the wafer 5 are very small so that the layers 70′, 8′ constitute minute dots, and even more important when the minute layers 7′, 8′ are closely adjacent to each other. Even a minor displacement of the tips 114 could result in the production of a defective transistor because the end portions 113 would not be connected to the respective contact 70, 80.

The angle alpha (FIG. 8*a*) between the axis of each coiled end portion 111 and the respective intermediate portion 112 in unstressed condition of the respective lead 110 is preferably a right angle. If the angle beta between the portions 112, 113 would also equal 90°, the end portion 113 would be tilted in response to forcible shifting of the coiled end portion 111 along the terminal 3 or 4 toward the base plate 1. The transversely extending end face 114′ of the tip 114 and the top surface of the layer 7′ or 8′ would then make an angle gamma (see FIG. 8*b*) which would prevent satisfactory surface-to-surface contact between such layer and the end portion 113. Thus, the tilting of the coiled end portion 111 with reference to the terminal 3 or 4 would establish a mere point contact between the layer 7′ or 8′ and the end face 114′ of the respective tip 114. This could result in the formation of an unsatisfactory bond, especially when the layer 7′ or 8′ is relatively thin so that it cannot furnish enough solder to fill the wedge-like gap shown in FIG. 8*b* between the end face 114′ and the top surface of the layer 7′. The thickness of the layers 7′, 8′ depends on their configuration, on the composition of their material and on the soldering procedure which is employed to bond the leads 110 to the terminals 3, 4 and to the contacts 70, 80. For example, the factors which influence the bond between the end portions 113 and the contacts 70, 80 of the wafer 5 include the temperature at which the soldering and/or coating operation is performed, the length of intervals during which the working parts of the transistor dwell in the soldering furnace or in a liquid solder, the nature of flux, and/or the nature of coating with solder e.g., by dipping, pouring or another procedure). These factors are not readily reproducible with such a degree of accuracy to insure, without fail, that the gap between the tip 114 and the layer 7′ shown in FIG. 8b will be filled with solder when the finished transistor emerges from the furnace, especially if the transistor is assembled in a mass-producing operation.

The above problems can be eliminated by shaping the leads 110 in such a way that, in the undeformed condition thereof, the angle beta between the portions 112, 113 equals 90° minus gamma wherein gamma represents that (relatively small) acute angle through which the straight end portion 113 of the lead 110 is tilted with reference to the plane of the top surface of the layer 7′ or 8′ during forcible axial shifting of the coiled end portion 111 along the terminal 3 or 4 toward the surface 1′ of the base plate 1. If the end face 114′ of the tip 114 is at least substantially normal to the axis of the end portion 113, and if the exposed top surface of the layer 7′ or 8′ is at least substantially parallel to the surface 1′ of the base plate 1, the tip 114 will be moved into full surface-to-surface abutment with the layer 7′ or 8′ when the coiled end portion 111 assumes the tilted position shown in FIG. 11. Consequently, even a relatively or extremely thin layer 7′ or 8′ can insure the formation of a strong and reliable fillet 7 or 8 between the contact 70 or 80 and the end portion 113 of the respective lead 110 in the fully assembled transistor (FIG. 7).

Figure 7:
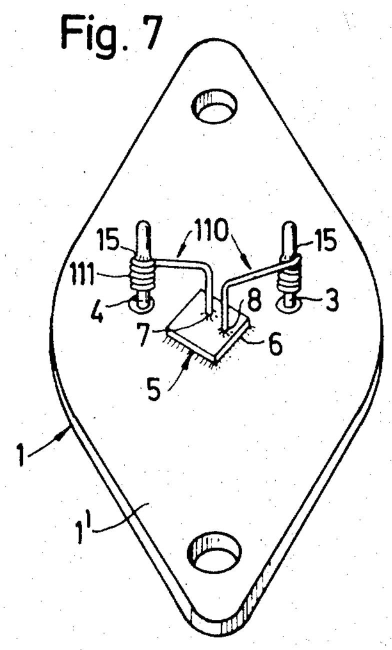
FIG. 7 is a perspective view of a finished second transistor which includes the working parts shown in FIG. 6.

FIGS. 8*a* to 10*b* illustrate various stages in the assembly of the transistor of FIG. 7, and more particularly the steps which precede and take place during bonding of one of the leads 110 to the contact 70 of the wafer 5 shown in FIG. 1. It is clear that the wafer 5 can be replaced with the wafer 105 of FIG. 1*a*.

Figure 8A:
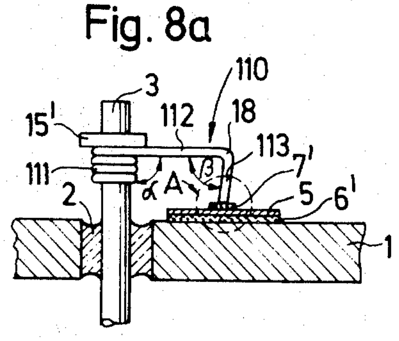
FIG. 8*a* is an enlarged fragmentary sectional view of the second transistor, showing one of the leads in a position it assumes prior to deformation in response to the application of an external axially oriented force.
Figure 8B:
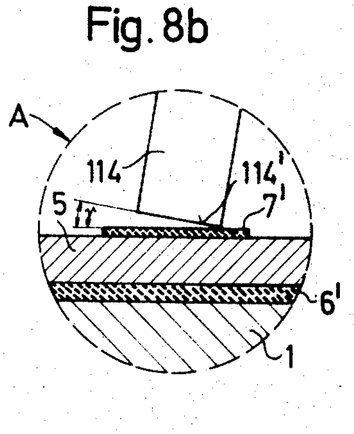
FIG. 8*b* is an enlarged view of a detail within the broken-line circle A shown in FIG. 8*a;*

FIG. 8*a* shows the first step which includes the slipping of the coiled end portion 111 of a lead 110 onto the terminal 3 so that the end face 114' of the tip 114 of the other end portion 113 makes with the exposed top surface of the layer 7' on the contact 70 (not shown) of the wafer 5 a relatively small acute angle gamma (see FIG. 8*b*). Thus, the tip 114 is in mere point contact with the layer 7'. This is due to the fact that the intermediate portion 112 makes with the axis of the coiled end portion 111 an angle alpha of 90° and that the axes of the portions 112, 113 make a relatively large acute angle beta which equals 90 degrees minus gamma. The wafer 5 is assumed to abut against the base plate 1 in the position shown in FIG. 6 and the terminal 3 is assumed to be permanently connected with the base plate by the insulator 2.

The ring 15' is thereupon slipped onto the terminal 3 so that it rests on the uppermost convolution of the coiled end portion 111. The ring 15' is thereupon pushed toward the base plate 1 by means of a pressure-indicating gauge or the like (not shown) to assume the axial position shown in FIG. 9*a*. As illustrated in FIG. 9*b*, the end face 114' of the tip 114 of the end portion 113 is then placed into full surface-to-surface abutment with the layer 7' on the contact 70 of the wafer 5. The coiled end portion 111 is tilted to assume the position shown in FIG. 11 whereby its convolutions $W_N$ and $W_t$ bear against the terminal 3 at the points 16 and 17. The end portion 113 of the thus deformed lead 110 biases the wafer 5 against the base plate 1.

Figure 10A:
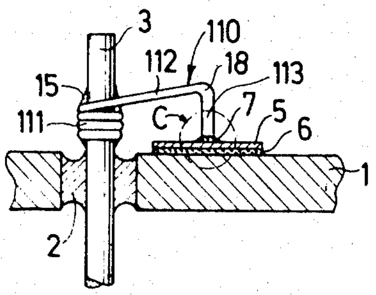
FIG. 10*a* illustrates the structure of FIG. 9*a* with the lead permanently bonded to the respective terminal and to the corresponding contact of the wafer.
Figure 10B:
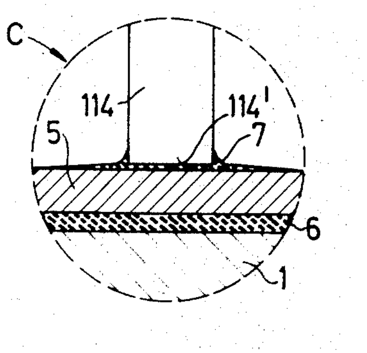
FIG. 10*b* is an enlarged view of a detail within the broken-line circule C shown in FIG. 10*a;*

In the next step, the thus assembled transistor is transported through the soldering furnace so that the material of the ring 15' and of the layers 6', 7' melts to form fillets 15, 6 and 7 shown in FIG. 10*a*. FIG. 10*b* shows that the end face 114' remains parallel to the general plane of the wafer 5 and is bonded to the contact 70 (not shown) by a flat fillet 7. The fillet 6 bonds the wafer 5 to the base plate 1 and the fillet 15 bonds the convolutions of the end portion 111 to the terminal 3. As shown in FIG. 10*a*, the material of the ring 15' melts completely during transport through the furnace so that this ring is converted into a fillet 15 which bonds the terminal 3 to several or all convolutions $W_t$ to $W_N$ of the coiled end portion 111.

If the heat expansion coefficient $\epsilon$ of the leads 110 differs substantially from the heat expansion coefficient of the base plate 1, the leads 110 must be dimensioned by full consideration of the fact that the extent of mechanical deformation of the soft solder of layers 7' and 8' (and of fillets 7 and 8) as well as of the elbows 18 (FIG. 11) between the intermediate portions 112 and the end portions 113 of the leads decreases in response to changes in temperature with increasing length of the end portions 113. If the leads 110 consist of Ag 97 Cu 3 alloy with a heat expansion coefficient $\epsilon$ $= 19.7 \cdot 10^{-6}$ per °C., if the material of the base plate 1 is a low-alloy steel with a heat expansion coefficient $\epsilon = 11.5 \cdot 10^{-6}$ per °C., if the length L of the intermediate portion 112 of a lead 110 is 6 millimeters, and if the ratio of the length of the end portion 113 to the diameter *d* of the wire of the lead 110 is 5:1, no breakdown will occur after at least 3,000 temperature changes between −40°C. and +160°C.

It was found that the difference between the diameter of the terminal 3 or 4 and the internal diameter of the coiled end portion 111 is quite satisfactory if it is within the range of between 0.01 and 0.03 millimeters. This allows for necessary tolerances in the mass-production of wire which is used for the making of leads 110 and further insures the establishment of satisfactory connections between the contacts 70, 80 and the end portions 113. Still further, such tolerances suffice to insure convenient manipulation of leads 110 during assembly with other working parts of the transistor and to insure satisfactory retention of coiled end portions 111 in the tilted and wedged positions shown in FIG. 9*a* during transport through the soldering furnace.

The diameter of the leads 110 depends on the current which is to flow between the terminals 3, 4 and the contacts 70, 80 as well as on the desired elasticity or springiness which increases with the fourth power of the diameter of the wire.

The material of the leads 110 should meet the following requirements:

1. It should be a good conductor of electric current.
2. It should be readily coatable with soft solder, particularly with soft solder containing a high percentage of lead.
3. It should exhibit satisfactory elasticity to permit deformation from the condition shown in FIG. 8*a* to the condition shown in FIG. 9*a*. Such elasticity should not be unduly affected by the heat treatment during transport through the soldering furnace, i.e., the leads 110 of the finished transistor should still exhibit a high degree of elasticity.
4. The electrical characteristics of the wafer 5 or 105 should not be altered (poisoned) by the ingredients of the alloy which is used for the manufacture of wire for the leads 110.

Figure 9A:
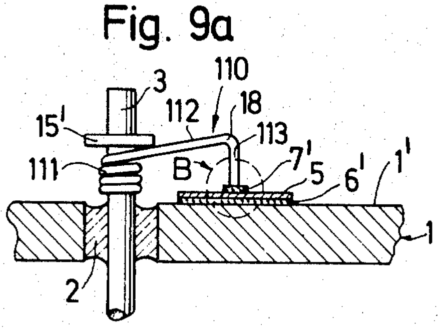
FIG. 9*a* illustrates the structure of FIG. 8*a* with the lead shown in a condition it assumes upon completion of the application of an external axially oriented deforming force.
Figure 9B:
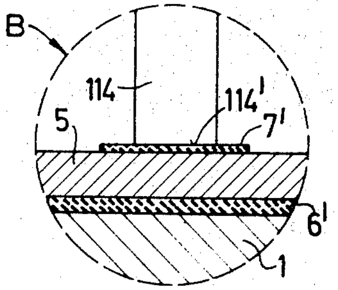
FIG. 9*b* is an enlarged view of a detail within the broken-line circle B shown in FIG. 9*a;*

Satisfactory elasticity of leads for the deformation from the condition of FIG. 8*a* to the condition of FIG. 9*a* and the preservation of desired elasticity upon completion of the soldering operation can be achieved by cold-forming of pure metals or by mixed crystallization in response to addition of alloying substances and subsequent cold forming (tempering). Such treatment renders it possible to properly select the mechanical factors which control the elasticity and the necessary broadening of the elasticity range, namely, the modulus of elasticity E, the elastic limit $\sigma_S$, the tensile strength $\sigma_B$ and the recrystallization temperature $T_R$ at which the factors E, $\sigma_S$ and $\sigma_B$ assume the low values which are characteristic of the unrefined condition. The materials which meet the above enumerated requirements for the leads 110 include the alloys Ag 97 Cu 3 and Ni Mn 0.3 ... 0.5.

The most important factors which must be considered in the selection of dimensions for the leads 110 are the elasticity modulus E, the tensile strength $\sigma_B$, the elastic limit $\sigma_S$, the recrystallization temperature $T_R$, the heat expansion coefficient $\epsilon$ and the specific electrical resistance $\rho$ of the material of the wire which is cut and shaped to obtain the leads. These factors for three different materials (Ag 97 Cu 3, Ni Mn 0.3 and Ni Mn 0.5) can be found in the table 1. The factors for the two base materials (Ag and Ni) in undeformed (annealed) condition are also listed in the table 1 for the purposes of ready comparison. The elasticity modulus E, the tensile strength $\sigma_B$ and the elastic limit $\sigma_S$ are determined by experimentation. The other factors are well known and can be found in pertinent literature.

TABLE I

| Material of leads 110 | E [kp./mm.²] | $\delta_B$ [kp./mm.²] | $\delta_S$ [kp./mm.²] | $T_R$ [° C.] | $\epsilon$ [$10^{-6}$ 1./° C.] | $\rho$ [$10^{-6}$. Ωcm] |
|---|---|---|---|---|---|---|
| Ag (soft) | 3,150 | 18 | 5 | 200 | 19.7 | 1.68 |
| Ag 97 Cu 3 (hard) | 5,600 | 50 | 50 | 600 | 19.7 | 1.94 |
| Ni (soft) | 8,500 | 38 | 20 | 550 | 14.5 | 7 |
| NiMnO; 3 (hard) | 14,100 | 80 | 70 | (a) | 13.3 | 8 |
| NiMnO, 5 (hard) | 15,600 | 85 | 70 | (a) | 12.2 | 9 |

[a] At least 550.

Figure 11:
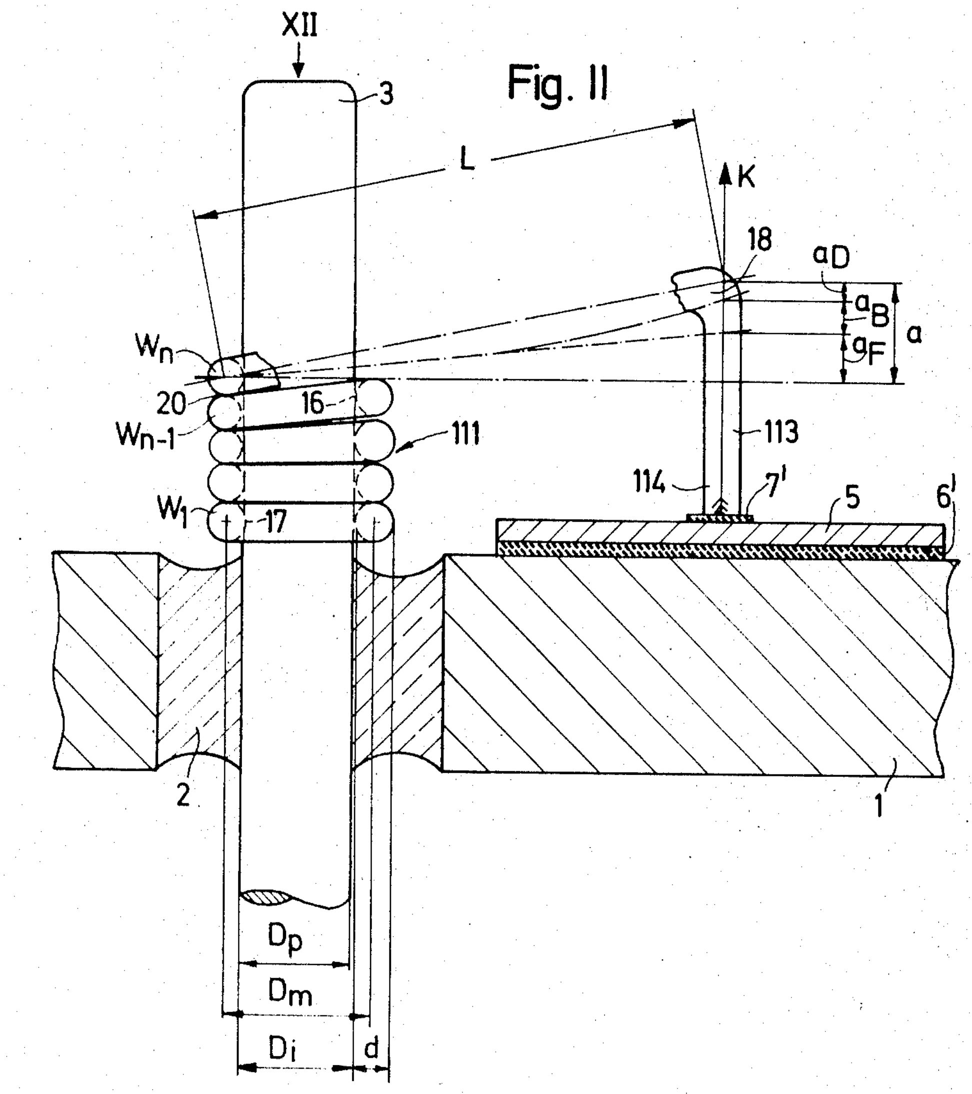
FIG. 11 is an enlarged view of the structure shown in FIG. 9*a;*
Figure 12A:
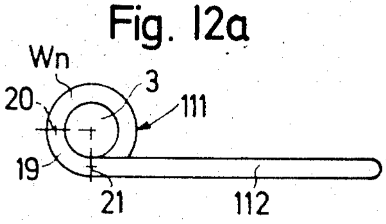
FIG. 12*a* is a smaller-scale plan view of the lead as seen in the direction of arrow XII in FIG. 11.
Figure 12B:
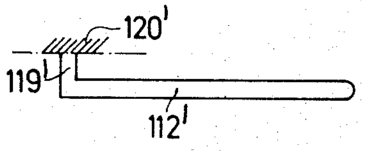
FIG. 12*b* is a simplified diagram of the structure shown in FIG. 12*a*.

The straight end portion 113 of each lead 110 bears against the layer 7' or 8' with a force K which is due to elastic deflection $a$ (FIG. 11). Such force is transmitted to the base plate 1 by way of the contact 70 or 80, wafer 5, contact 60 and layer 6'. The deflection $a$ can be determined by resorting to the equation (I) $a = a_F + a_B + a_D$ wherein $a_F$ represents the deflection due to expansion of the coiled end portion 111 which acts not unlike a helical spring, $a_B$ represents the deflection due to flexing of the intermediate portion 112 which acts as a cantilever, and $a_D$ represents the deflection due to torsional twisting of the portion 19 (FIG. 12*a*) of the uppermost convolution $W_N$ of the coiled end portion 111 (namely, of that convolution which is integral with the intermediate portion 112). The portion 19 of the end convolution $W_N$ extends from the point 20 to the point 21 (FIG. 12*a*). The point 20 represents the locus of contact between the uppermost convolution $W_N$ and the next-to-the-uppermost convolution $W_{N-1}$ (FIG. 11) of the end portion 111. As shown diagrammatically in FIG. 12*b*, the twisted portion 19 of the convolution $W_N$ can be represented by a rod 119' which is fixedly mounted at 120' and is twisted in response to turning of the arm 112'.

The equation (I) can be expressed as follows:

(II) $a_F + a_B + a_D = K\,[(1/c_F) + (1/c_B) + (1/c_D)]$ wherein $c_F$ is the extent of elastic deformation of the coiled end portion 111, $c_B$ is the extent of elastic deformation of the intermediate portion 112, and $c_D$ is the extent of elastic deformation of the portion 19 of the end convolution $W_N$. In order to insure that the elasticity range of the material of the leads 110 is not exceeded, the values $c_F$, $c_B$ and $c_D$ can be calculated with a satisfactory degree of accuracy as follows:

(III*a*) $c_F = Ed^4/iD_m 20 \cdot L^2$ (III*b*) $c_B = 3E\pi d^4/64 \cdot L^3$ (III*c*) $c_D = E\pi d^4/Dm\, L^2 \cdot 40$ wherein $E$ is the elasticity modulus of the wire, $d$ is the diameter of the wire, $L$ is the length of the straight intermediate portion 112, $Dm$ is the median diameter of convolutions of the end portion 111, and $i$ is the number of convolutions of the end portion 111 (whereby $i \geqq 3$).

Based on the normally expected condition that (IV) $(\pi i/2) > (3iDm/L) > 1$, the comparison (V) $c_F : c_B : c_D = 1 : 3iDm/L : \pi i/2$ indicates that $c_F < c_B < c_D$ resp. $a_F > a_B > a_D$. Thus, the coiled end portion 111 contributes most and the portion 19 of the end convolution $W_N$ contributes least to the total deflection $a$. By using a lead 110 having the typical dimensions L = 5 mm, $i$ = four convolutions and $Dm$ = 1.32 mm, the ratio of $$c_F : c_B : c_D = 1 : 3.17 : 6.3$$

and the ratio of $$a_F : a_B : a_D = 1 : 0.32 : 0.16.$$

The forces $K_F$, $K_B$ and $K_D$ which must be applied to respectively deform the portion 111, the intermediate portion 112 and the portion 19 of the end convolution $W_N$ to the limit of elasticity can be calculated as follows:

(VI*a*) $K_F = (0.55\sigma_B \pi d^3/8\ \mathrm{KL})$ (VI*b*) $K_B = (\sigma_B \pi d^3/32L)$ (VI*c*) $K_D = (\sigma_B \pi d^3/32L)$ A comparison of (VII) $K_B : K_D : K_f = 1 : 1 : (2.2/K)$ with (VIII) $K = 1 + (5/4) \cdot (d/Dm) + (7/8) \cdot (d/Dm)^2 + (d/Dm)^{3b}$, and by considering that $1 < K < 2$ indicates that $K_F > K_B$ and $K_B = K_D$.

In order to insure that none of the portions 111, 112, 19 of a lead 110 are stressed beyond the limit of elasticity, the force K should not exceed $K_B = K_D = K_{B,D}$. If the wafer 5 is to be subjected to a maximum force which cannot exceed $K_H$, and if (IX) $K_H \geqq K_{B,D}$, the coiled end portion 111 can be shifted along the terminal 3 or 4 by a distance $a$ which can be calculated as follows:

(X) $a = K_{B,D}\,[(1/c_F) + (1/c_B) + (1/c_D)]$.

In actual practice, the relationship $a_F = K_{B,D}/c_F$ is not applied to the full extent because the aforementioned tilting of the end portion 111 with reference to the terminal 3 or 4 only causes an expansion of the end portion 111 to the extent as represented by the equation (XI) $a_{F,V} = L \cdot \sqrt{1 - (D_p/D_i)^2}$. This can be readily verified by considering FIG. 11 of the drawing. Thus, in selecting the dimensions of the leads 110, the value of $a_{F,V}$ should be compared with the value of $a_F$ and the smaller of the two values is then considered in determining the total deflection $a$.

If the working parts of the transistor are to be connected to each other with soft solder containing a high percentage of lead and at a soldering temperature of up to about 400°C., the wafer 5 can be safely subjected to a pressure of up to 1.3 pond/mm² provided that the thickness of the wafer is several tenths of a millimeter and that the layer 6' of solder has a thickness of at least 0.06 mm. This insures that the material of the layer 6' is not squeezed out of the space between the wafer 5 and the base plate 1 during transport of the assembled transistor through a soldering furnace. All other conditions being the same, and assuming that the pressure upon the wafer 5' is increased to 5.7 pond/mm², some material of the layer 6' will be squeezed beyond the edge faces of the wafer when such material melts in the soldering furnace. However, this does not result in damage to the wafer 5 if the latter's thickness is not less than 0.15 mm.

If the cross-sectional area $F_H$ of the water 5 (in a plane which is parallel to the layer 6') equals 16mm², the total force $K_H$ which can be applied to the wafer (at a permissible unit pressure of 1.3 pond/mm²) equals 20.8 pond. If the material of the lead 110 is Ag 97 Cu 3, if the diameter $D_p$ of the terminal 3 or 4 is 1 mm, if the elasticity modulus E of the material of the lead 110 is 5,600 kp/mm², if $Dm = Di + d = 1.32$ mm, and $i = 4$ convolutions, the preceding equations can be employed to calcualte that $K_B = K_D = 26.5$ pond. Since $K_{B,D} > K_H$, the deflection $a$ of the lead 110 can be said to equal $K_H\,[(1/c_F) + (1/c_B) + (1/c_D)]$. However, if $K_{B,D} < K_H$, then $$a = K_{B,D}\,[(1/c_F) + (1/c_B) + (1/c_D)].$$

A comparison of $a_F$ with $a_{F,V}$ indicates that $a_F = (K_H/c_F) = 1.21$ mm, and that $a_{F,V} = 1$ mm. Thus, $a_F$ must be replaced by $a_{F,V}$. The other parts of the deflection a are as follows:

$a_B = (K_H/c_B) = 0.39$ mm, and $a_D = (K_H/c_D) = 0.19$ mm.

Consequently, the total deflection $a$ of the lead 110 cannot exceed 1.21 mm + 0.39 mm + 0.19 mm = 1.79 mm. This insures that the lead 110 will not be subjected to a permanent deformation. The permissible values of $a$ which were calculated as per preceding equations were found to be eminently satisfactory in actual practice.

In order to insure that the working parts 1, 5 and 110 do not change positions during soldering, the distance $a$ should not be less than the distance $a_L$, namely, a distance which the wafer 5 covers under the action of the force K in a direction toward the base plate 1 as a result of softening of the layers 6', 7', 8' in a soldering furnace. As a rule, the distance $a_L$ is within the range of one or more tenths of a millimeter and the distance $a$ can be selected to equal about 1 mm.

The above calculations can be resorted to, with minimal changes, in calculating the dimensions of leads 10' of the type shown in FIG. 5, i.e., wherein the straight end portion 13' and the coiled end portion 11' extend in opposite directions with reference to the axis of the intermediate portion 12'.

An important advantage of the method of assembling the transistor of FIG. 7 is that the force with which the working parts 1, 5, 110, 110 of the transistor are held against undesirable movement with reference to each other during soldering substantially exceeds the force which is due to the weight of the leads 110. As mentioned above, the likelihood of uncontrolled shifting of working parts prior to and during transport through the soldering furnace is particularly pronounced if the wafers 105 or 5 are provided with minute layers 107' or 7', 8' of soft solder. Due to axial shifting of the coiled end portions 111 in response to the application of an external deforming force which is a multiple of the force due to the weight of the leads, the thus deformed leads are automatically locked to the respective terminals and their end portions 113 exert against the wafers 5 or 105 a pressure which prevents any movements of the tips 114 with reference to the layers 7', 8' or 107' and at the same time holds the wafers against any movement with reference to the base plates 1.

It is clear that a transistor which is produced in accordance with my method can embody two or more wafers (chips) and that the method can be resorted to for the production of minute as well as relatively large transistors. Moreover, the wafers shown in FIGS. 1 and 2 are but two specific examples of wafers capable of being used as working parts of transistors which are assembled in accordance with the improved method.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a method of assembling the working parts of a transistor wherein a coiled first end portion of a metallic lead surrounds a metallic terminal and is bonded thereto by soft solder and the working parts of the transistor further include a semiconductor wafer having a first side provided with a first contact which is coated with a first layer of solder abutting against the base and a second side provided with at least one second contact coated with a second layer of solder, the lead having a straight second end portion provided with an end face which abuts against and is inclined with reference to the second layer, the steps of applying a ring of soft solder over the first end portion of the lead on the terminal so that the ring overlies the first end portion; applying to the first end portion of the lead an axially oriented force in a direction toward the base to shift and to simultaneously tilt the first end portion with reference to the terminal and to thereby clamp the first end portion to the terminal in a position in which the end face of the second end portion is in surface-to-surface abutment with the second layer and biases the wafer against the base with a force which exceeds the force due to the weight of the lead; and heating the ring to melting temperature so that the material of the ring melts and forms a fillet which bonds the coiled first end portion to the terminal, said heating step including heating the layers to a temperature at which the layers are converted into fillets connecting the wafer to the base and the second contact with the second end portion of the lead.

2. The steps as defined in claim 1, wherein said melting step is carried out in vacuo.

3. The steps as defined in claim 1, wherein said melting step is carried out in a protective atmosphere of inert gas.

4. The steps as defined in claim 1, wherein said melting step is carried out while the terminal and the lead are caused to move through a soldering furnace.

5. The steps as defined in claim 1, wherein the internal diameter of the ring exceeds the diameter of the terminal prior to said melting step.

6. The steps as defined in claim 1, wherein the lead has a straight intermediate portion making with the second end portion a first acute angle and wherein the end face of the second end portion of the lead makes with the second layer a second acute angle prior to the application of said axially oriented force, the sum of said first and second angles being about 90°.

7. The steps as defined in claim 6, wherein said second angle is a small fraction of said first angle.

8. The steps as defined in claim 6, wherein the axis of the coiled first end portion and intermediate portion of the lead make a third angle which at least approximates 90° prior to the application of said axially oriented force.

9. The steps as defined in claim 1, wherein the extent of axial movement of the coiled first end portion of the lead in response to the application of said axially oriented force is at least 1 mm.

* * * * *